United States Patent
Dexheimer et al.

(10) Patent No.: US 6,921,737 B1
(45) Date of Patent: Jul. 26, 2005

(54) METHOD OF SYNTHESIZING A DOUBLE METAL CYANIDE CATALYST

(75) Inventors: Edward M. Dexheimer, Grosse Ile, MI (US); Jacob Wildeson, Chambersburg, PA (US); Werner Hinz, Grosse Ile, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 10/853,814

(22) Filed: May 26, 2004

(51) Int. Cl.$^7$ .............................................. B01J 27/26
(52) U.S. Cl. ..................... 502/175; 423/361; 423/364; 423/367; 423/383
(58) Field of Search ....................... 502/175; 423/361, 423/364, 367, 383

(56) References Cited

U.S. PATENT DOCUMENTS

| | | | |
|---|---|---|---|
| 6,436,867 B1 * | 8/2002 | Dexheimer et al. | 502/175 |
| 6,593,268 B2 * | 7/2003 | Dexheimer et al. | 502/175 |
| 6,596,842 B2 * | 7/2003 | Eleveld et al. | 528/412 |

* cited by examiner

*Primary Examiner*—Elizabeth D. Wood
(74) *Attorney, Agent, or Firm*—Fernando A. Borrego; Howard & Howard Atty

(57) ABSTRACT

An improved method for synthesizing a double metal cyanide (DMC) catalyst combines and sonicates aqueous and non-aqueous solutions of a first metal salt, such as $Zn(OAc)_2$, of a second metal salt, such as $CoCl_2$, and of an alkali metal cyanide, such as NaCN, to synthesize the DMC catalyst, $Zn_3[Co(CN)_6]_2$. An improved method of producing a polyether polyol uses the DMC catalyst to produce the polyol.

31 Claims, No Drawings

METHOD OF SYNTHESIZING A DOUBLE METAL CYANIDE CATALYST

FIELD OF THE INVENTION

The subject invention relates generally to a method of synthesizing a double metal cyanide (DMC) catalyst and to a method of producing a polyether polyol. More specifically, the method of synthesizing the DMC catalyst combines and sonicates a solution of a first metal salt, a solution of a second metal salt, and a solution of an alkali metal cyanide to synthesize the DMC catalyst, and the method of producing the polyether polyol uses the synthesized DMC catalyst.

BACKGROUND OF THE INVENTION

Polyether polyols are integral intermediate components utilized to manufacture a wide array of products, including polyurethanes. As such, the production of polyether polyols is critical. It is known in the art that polyether polyols are produced from the polymerization of epoxides, such as ethylene oxide (EO) and propylene oxide (PO). It is also known in the art that double metal cyanide (DMC) catalysts are effective catalysts for the polymerization of the epoxides. DMC catalysts produce polyether polyols having narrow molecular weight distributions as well as relatively low unsaturation.

In conventional methods, DMC catalysts are synthesized by combining an aqueous solution of a metal salt and an aqueous solution of a complex metal cyanide salt. As a specific example, an aqueous solution of $ZnCl_2$ (excess), as the metal salt, is combined with an aqueous solution of $K_3Co(CN)_6$, as the complex metal cyanide salt. This combination precipitates out the desired DMC catalyst, in this case specifically $Zn_3[Co(CN)_6]_2$. Examples of such conventional methods are disclosed in U.S. Pat. Nos. 5,470,813 and 5,714,639. These conventional methods, in one form or another, utilize a complex metal cyanide salt. The complex metal cyanide salts are very expensive which limits the economic viability of utilizing DMC catalysts in the production of polyether polyols.

In other conventional methods, DMC catalysts are synthesized by combining an aqueous solution of a first metal salt with an aqueous solution of a second metal salt and with an aqueous solution of an alkali metal cyanide in a single step to synthesize the DMC catalyst. Examples of such conventional methods are disclosed in U.S. Pat. Nos. 6,436,867 and 6,593,268. Although such methods do not rely on use of a complex metal cyanide salt, they remain deficient because these methods do not utilize sonication during synthesis of the DMC catalysts. Without making use of sonication, these methods synthesize DMC catalysts with increased particle size and, thus, with less active surface area per particle of DMC catalyst. Furthermore, the DMC catalysts synthesize according to these methods without sonication during synthesis have less desirable morphology with inconsistent surface uniformity which makes active sites of the DMC catalysts less accessible when used to produce a polyether polyol.

U.S. Pat. No. 6,596,842 to Eleveld et al. discloses use of sound waves, including ultrasonic sound waves, to 'treat' a DMC catalyst that is used in a process for polymerizing alkylene oxides to produce polyether polyols. Typically, the '842 patent treats the DMC catalyst while the DMC catalyst is being transported to the reactor that is used to produce the polyether polyols. The '842 patent also notes, however, that the DMC catalyst can be treated in a catalyst slurry. This catalyst slurry is generated after that DMC catalyst of the '842 patent has already been synthesized and it is merely a mixture of a small amount of the DMC catalyst and a polyether polyol. In short, the '842 patent does not utilize any sound waves for treatment during actual synthesis of the DMC catalyst. As such, the DMC catalyst of the '842 patent, which is to be subsequently treated with sound waves, is already deficient synthesis of the DMC catalyst itself. Furthermore, the DMC catalysts of the '842 patent are synthesized using complex metal cyanide salts, and these catalysts, as described above, are not economically attractive.

Due to the deficiencies of conventional methods for synthesizing DMC catalysts, including those described above, it would be desirable to provide a method of synthesizing DMC catalysts that does not utilize expensive complex metal cyanide salts as intermediates thereby improving the economic viability of DMC catalysts utilized in the production of polyether polyols. It would also be desirable if the method provides a DMC catalyst that has decreased particle size with more active surface area per particle of the DMC catalyst as well as improved overall morphology.

SUMMARY OF THE INVENTION

A method of synthesizing a double metal cyanide (DMC) catalyst and a method of producing a polyether polyol are provided. The synthesis method of the subject invention combines and sonicates a solution of a first metal salt of the general formula $M(X)_m$, a solution of a second metal salt of the general formula $N(Y)_n$, and a solution of an alkali metal cyanide to synthesize the DMC catalyst.

More specifically, with the solution of the first metal salt, M is selected from the group of aluminum, zinc, and the transition metals; X is an anion selected from the group of halides, hydroxides, sulfates, carbonates, cyanides, oxalates, thiocyanates, isocyanates, isothiocyanates, carboxylates, and nitrates; and m is a value from 1 to 3 satisfying the valency state of M. With the solution of the second metal salt, N is selected from the group of the transition metals and the lanthanides; Y is an anion selected from the group of halides, hydroxides, sulfates, carbonates, cyanides, oxalates, thiocyanates, isocyanates, isothiocyanates, carboxylates, and nitrates; and n is a value from 1 to 3 satisfying the valency state of N.

The method of producing the polyether polyol polymerizes an alkylene oxide in the presence of an initiator and the DMC catalyst which, as described above, has been synthesized by combining the solutions of the first metal salt, the second metal salt, and the alkali metal cyanide, and has been subjected to sonication during synthesis.

The method of synthesizing the DMC catalyst according to the subject invention does not utilize complex metal cyanide salts. Additionally, this method makes use of sonication during synthesis of the DMC catalyst such that the DMC catalyst that is synthesized has decreased particle size as compared to a DMC catalyst that is synthesized without reliance on sonication during synthesis. With the decreased particle size, the DMC catalysts synthesized according to the present invention have more active surface area per particle of the DMC catalyst as well as improved overall morphology as evidenced by surface uniformity. This overall improvement in morphology of the DMC catalyst produces a polyether polyol with a narrower molecular weight distribution. It is believed that this narrower molecular weight distribution produces a better quality product, i.e., a better quality polyether polyol.

DETAILED DESCRIPTION OF A PREFERRED EMBODIMENT

A method of synthesizing a double metal cyanide (DMC) catalyst and a method of producing a polyether polyol are disclosed. The method of producing the polyether polyol uses the DMC catalyst synthesized herein and is described additionally below. As for the method of synthesizing the DMC catalyst, this method combines and sonicates a solution of a first metal salt, a solution of a second metal salt, and a solution of an alkali metal cyanide. The first metal salt, the second metal salt, and the alkali metal cyanide are also referred to throughout as 'the reagents'.

A solution of the first metal salt is prepared. The solution of the first metal salt can range from 0.1 to 50, more preferably from 0.5 to 10, parts by weight of the first metal salt based on 100 parts by weight of the solution. Similarly, the solution of the second metal salt and the solution of the alkali metal cyanide are also prepared. Like the solution of the first metal salt, the solutions for the second metal salt and for the alkali metal cyanide can also range from 0.1 to 50, more preferably from 0.5 to 10, parts by weight of the second metal salt and the alkali metal cyanide, respectively, based on 100 parts by weight of the solution. Despite the respective concentrations in each solution, upon combining, the first metal salt is preferably combined in molar excess relative to the second metal salt. The molar ratio of the first metal salt to the second metal salt is described additionally below in Example 1.

The first metal salt is more specifically of the general formula $M(X)_m$. In this formula, it is to be understood that M is selected from the group of aluminum, zinc, and the transition metals, X is an anion selected from the group of halides, hydroxides, sulfates, carbonates, cyanides, oxalates, thiocyanates, isocyanates, isothiocyanates, carboxylates, and nitrates, and m is a value from 1 to 3 satisfying the valency state of M. In one preferred embodiment of the subject invention, M is selected from the group of Al(III) and Zn(II), X is an anion selected from the group of halides and acetate, and m is a value from 1 to 3 satisfying the valency state of M. Most preferably, the first metal salt of the subject invention is $ZnCl_2$, $ZnI_2$, $ZnBr_2$, or $Zn(OAc)_2$.

The second metal salt is more specifically of the general formula $N(Y)_n$. In this formula, it is to be understood that N is selected from the group of the transition metals and the lanthanides, Y is an anion selected from the group of halides, hydroxides, sulfates, carbonates, cyanides, oxalates, thiocyanates, isocyanates, isothiocyanates, carboxylates, and nitrates, and n is a value from 1 to 3 satisfying the valency state of N. In one preferred embodiment of the subject invention, N is selected from the group of the Fe(II), Fe(III), Co(II), Co(III), and Nd(III), Y is an anion selected from the group of halides, and n is a value from 1 to 3 satisfying the valency state of N. More preferably, the second metal salt of the subject invention is $CoCl_2$ and, most preferably, the second metal salt is $CoBr_2$.

Group IA alkali metals may be utilized for the alkali metal cyanide of the subject invention. Preferably, the alkali metal cyanide utilized is KCN, LiCN, or NaCN. However, other alkali metal cyanides may be utilized without varying the scope of the subject invention. Although KCN is utilized in Example 1 below, the most preferred alkali metal cyanide in a solution is NaCN.

The solutions of the first metal salt, the second metal salt, and the alkali metal cyanide can be either aqueous solutions or non-aqueous solutions. If aqueous solutions, then the first metal salt, the second metal salt, and the alkali metal cyanide are dissolved in water. Use of aqueous solutions is most preferred for synthesis of the DMC catalyst according to the present invention.

On the other hand, if the solutions of the first metal salt, the second metal salt, and the alkali metal cyanide are non-aqueous solutions, then the first metal salt, the second metal salt, and the alkali metal cyanide are dissolved in a non-aqueous solvent. More specifically, this non-aqueous solvent is selected from the group of polar protic solvents, dipolar aprotic solvents, and combinations thereof. For instance, a non-aqueous solution of the first metal salt would include the first metal salt and the non-aqueous solvent, and this non-aqueous solvent can be a polar protic solvent, a dipolar aprotic solvent, a combination of a polar protic solvent and a dipolar aprotic solvent, or a combination of polar protic solvents and/or dipolar aprotic solvents. The same would be true for non-aqueous solutions of the second metal salt and the alkali metal cyanide.

The non-aqueous solvent is anhydrous, i.e., free of water. Like water in the aqueous solutions, the non-aqueous solvent fulfills various functions during the synthesis of the DMC catalyst. The non-aqueous solvent solvates the reagents. As such, each reagent is dissolved and this facilitates necessary collisions between the reagents that must occur to appropriately synthesize the DMC catalyst. The non-aqueous solvent may also function to control temperature during the synthesis of the DMC catalyst. Preferably, the non-aqueous solvent is inert, i.e., does not react, during the synthesis.

As is understood by those skilled in the art, polar protic solvents and dipolar aprotic solvents are generally distinguishable by their respective polarities. To this end, a polar protic solvent typically includes a hydrogen atom attached to an electronegative atom, which is generally oxygen, but can also be other atoms including, but not limited to, nitrogen and sulfur. When the electronegative atom is oxygen, a typical polar protic solvent is a compound that can be represented by the general formula R—O—H. The general formula R—O—H is not to be interpreted to be limited to an alcohol though these may be most economical. For instance, when the electronegative atom is oxygen, acetic acid falls within the general formula R—O—H, where R=an acetyl group. The polarity of a polar protic solvent is due to the O—H bond, more specifically due to a bond dipole of the O—H bond. The O—H bond has a bond dipole because there is a large difference in electronegativities of the oxygen atom and the hydrogen atom and also because the hydrogen atom is small relative to the oxygen atom.

Examples of various polar protic solvents suitable for use in the method of the present invention include, but are not limited to, alkanols, carboxylic acids, and combinations thereof. Although not necessarily required, it is preferred that the alkanols are selected from the group of methanol, ethanol, propanols, butanols, and combinations thereof. By the plural form of propanols and butanols, it is meant to include the various isomers of propanol and butanol. One non-limiting example of a suitable carboxylic acid is acetic acid. Methanol, which is a polar protic solvent, is the most preferred non-aqueous solvent in the method of the present invention. As such, if non-aqueous solutions are utilized, it is most preferred that the first metal salt, the second metal salt, and the alkali metal cyanide are dissolved in methanol.

A dipolar aprotic solvent is a type of solvent that is incapable of donating or accepting protons. Unlike polar protic solvents, dipolar aprotic solvents do not contain an O—H bond. Dipolar aprotic solvents all contain a bond that has a large bond dipole, which is typically a multiple bond between a carbon atom and either an oxygen, nitrogen, or sulfur atom. Most dipolar aprotic solvents contain a double bond between a carbon atom and an oxygen atom. Examples of various dipolar aprotic solvents suitable for use in the method of the present invention include, but are not limited to, ketones (such as acetone, methyl ethyl ketone, and methyl isobutyl ketone), alkyl acetates (such as ethyl acetate), nitrites (such as acetonitrile), formamides (such as dimethylformamide), sulfoxides (such as dimethyl sulfoxide), N-alkylpyrrolidinones (such as N-methylpyrrolidone), and combinations thereof.

During combining, all three solutions, whether aqueous or non-aqueous, of the first metal salt, of the second metal salt, and of the alkali metal cyanide can be combined in a single step via three, separate feed streams into a reactor, which is originally empty. That is, each specific solution can be independently fed into the reactor. Alternatively, during combining, the solution of the first metal salt and the solution of the second metal salt, although separate, can each be simultaneously fed into the reactor, which originally contains the solution of the alkali metal cyanide.

In one particular embodiment of the present invention, the method of the subject invention first combines the solution of $M(X)_m$ and the solution of $N(Y)_n$ to establish a first solution. The first solution, which includes the solutions of both the first metal salt, $M(X)_m$, and the second metal salt, $N(Y)_n$, is then combined with the solution of the alkali metal cyanide, such as a solution of KCN or NaCN, to form the DMC catalyst. As the first solution is being combined with the solution of the alkali metal cyanide, the solution of the alkali metal cyanide is preferably being agitated via mechanical stirring. Mechanical stirring remains advantageous even with sonication. Combination of the first solution with the solution of the alkali metal cyanide is still considered a single step within the method of the present invention because, although the solution of the first metal salt, $M(X)_m$, is first added along with the solution of the second metal salt, $N(Y)_n$, to establish the first solution, there is no reaction between the first metal salt and the second metal salt in the first solution. Thus, in this particular embodiment, the separate establishment of the first solution is not a distinct step.

As set forth above, the present invention sonicates to synthesize the DMC catalyst. Sonication is utilized whether the respective solutions are aqueous solutions or non-aqueous solutions. Sonication, as used in the context of the present invention, must occur at least, in part, during synthesis of the DMC catalyst. As such, the sonication is, at some point in time, simultaneous with the combining of the solutions. It is to be appreciated that it is possible that sonication can also be introduced after the DMC catalyst has already been synthesized. However, even in this instance, sonication must also have occurred during the synthesis of the DMC catalyst that is now being post-sonicated.

Sonication utilizes high frequency sound waves to strategically disrupt a liquid solution or a combination of liquid solutions. Without intending to be bound by theory, it is believed that this disruption causes cavitation where microscopic bubbles form and collapse thereby generating significant amounts of energy that effectively mechanically agitate or mix a solution at a microscopic scale.

As the solutions of the various reagents are being combined, they are also sonicated. In one embodiment, during synthesis of the DMC catalyst, sonication may be introduced in a reaction media that includes water, t-butanol, a polyether polyol, and the first metal salt. In this particular embodiment, the water is present because the first metal salt is in aqueous solution. As is known to those skilled in the art, the polyether polyol is present, at this point in the reaction media, as a surface-active agent, i.e., as a surfactant, that assists in activating the DMC catalyst by influencing how the DMC catalyst precipitates out of the water. Examples of such surface-active agents include, but are not limited to, PLURONIC® and PLURONIC® R Block Copolymer Surfactants commercially available from BASF Corporation, especially PLURONIC® L61 and L62. Sonication is introduced long enough to ensure that the surface-active agent is adequately dispersed prior to addition of the solutions of the second metal salt and the alkali metal cyanide, preferably for approximately from 5 to 10 minutes. In this embodiment, the sonication continues while the solutions of the second metal salt and the alkali metal cyanide are added, preferably for approximately from 30 to 60 minutes. Further, even after the solutions of the second metal salt and the alkali metal cyanide are added, sonication is preferably continued for an additional 10 minutes. This additional sonication may be as precipitation of the catalyst is occurring. The description immediately above is merely an example of one particular embodiment. Depending on the particular embodiment relative to the manner of combining the various solutions, a source of the sonication can be initially disposed in an empty reactor (where the various reactants are then added to the reactor) or in a reactor that already contains a solution, such as the solution of the first metal salt or the solution of the alkali metal cyanide.

Preferably, the source of the sonication is the Sonicator® 3000, which is commercially available from Misonix Incorporated of Farmingdale, N.Y. However, it is to be understood that any ultrasonic liquid processor will suffice so long as the ultrasonic liquid processor is suitable to achieve the required level of sonication. As a non-limiting example, the source of the sonication could also be the Sonicator® XL 2000, which is also commercially available from Misonix Incorporated. As is understood by those skilled in the art, these sources more specifically include a vibratory element, such as a horn or a probe. Preferably, the vibratory element is disposed in the reactor. As such, it is also preferred that the vibratory element is actually submerged in the various reactants. However, it is also possible that the vibratory element can be adjacent, and therefore, not necessarily disposed in, the reactor so long as sufficient energy can be imparted onto the reactants. For instance, a sonication bath could also be utilized with a beaker containing the various reactants disposed in the sonication bath.

Preferably, the sonication is conducted at a frequency of at least 15, more preferably of at least 20, kHz and for a time period of from 1 to 60, more preferably from 15 to 45, minutes. Furthermore, it is also preferred that sonication is conducted at a source power of at least from 20, more preferably of at least 50 eW. It is also to be understood that sonicating can be continuous sonication for the time period or it can be discontinuous sonication for the time period. Discontinuous sonication is also referred to as on/off or off/on pulsing and many sources of sonication are capable of discontinuous sonication.

Upon combining, a suspension is formed. The suspension has a continuous phase and a particle phase. The particle phase is dispersed throughout the continuous phase and this particle phase includes the DMC catalyst synthesized from the combination of the solutions of the first metal salt, the second metal salt, and the alkali metal cyanide. The continuous phase includes a secondary product, i.e., part or all of the byproduct salt.

The suspension may be further processed to separate the particle phase from the continuous phase. The most preferred manner in which to separate the particle phase from the continuous phase is to filter the suspension to collect the particle phase, which as set forth above, includes the DMC catalyst, as a retentate. Prior to filtering the suspension, the suspension may, optionally, be held until the particle phase at least partially separates from the continuous phase. If the suspension is held, it is preferably held for from 0.5 to 24 hours. If the particle phase is suitably separated from the continuous phase, then the continuous phase can simply be decanted. Centrifugation and/or sedimentation of the suspension may even be utilized to enhance separation.

Regardless of whether the suspension is held, simply decanted, or subject to centrifugation and/or sedimentation, the suspension is preferably filtered via any method that would be known to a person of ordinary skill in the art. As non-limiting examples, the suspension may be filtered by processing through a coarse glass frit (for lab scale purposes) or may be filtered by processing through some form of an industrial filter (for industrial-scale manufacturing purposes) to collect the retentate. Once the retentate is collected, the step of separating the particle phase from the continuous phase continues by drying the retentate, either by simple air-drying or by vacuum-drying.

The method of producing the polyether polyol according to the present invention utilizes the DMC catalyst synthesized as described above. More specifically, this method polymerizes an alkylene oxide in the presence of an initiator and the DMC catalyst. Of course, as described above, the DMC catalyst has been synthesized by combining the solutions of the first metal salt, the second metal salt, and the alkali metal cyanide, and the DMC catalyst has also been subjected to sonication during this synthesis.

It is to be understood that more than one alkylene oxide and more than one initiator may be used, if desired. To this end, suitable alkylene oxides include, but are not limited to, ethylene oxide, propylene oxide, butylene oxide, and combinations thereof. Suitable initiators include, but are not limited to, di- and poly-functional alcohols and amines.

Although not required, in an alternative embodiment, the polymerization is a co-polymerization where the alkylene oxide and $CO_2$ are co-polymerized in the presence of the initiator and the DMC catalyst. This co-polymerization more specifically produces a polycarbonate polyol which, in the art, is also referred to as a polyethercarbonate.

The following Examples illustrate the nature of the subject method invention with regard to the synthesis of the DMC catalyst and with regard to the production of the polyether polyols and polycarbonate polyols. The Examples presented herein are intended to illustrate, and not to limit, the subject invention.

EXAMPLE 1

The method synthesizes the DMC catalyst in a single step according to the following general chemical equation:

$$3Zn(OAc)_2 + 2CoCl_2 + 12KCN \longrightarrow Zn_3[Co(CN)_6]_2$$

The solution of the first metal salt, $Zn(OAc)_2$, was combined with the solution of the second metal salt, $CoCl_2$, and with the solution of the alkali metal cyanide, KCN, to synthesize the DMC catalyst, $Zn_3[Co(CN)_6]_2$.

More specifically, 1.00 grams of $Zn(OAc)_2$ (specifically $Zn(OAc)_2 \cdot 2H_2O$) and 0.36 grams of $CoCl_2$ (specifically $CoCl_2 \cdot 6H_2O$) were dissolved in 10 ml of deionized (DI) $H_2O$ in a beaker. In particular, the 1.00 grams of $Zn(OAc)_2$ were added into the beaker, along with a surface-active agent and the DI water. These reactants were sonicated, and then the 0.36 grams of $CoCl_2$ were added. KCN was also dissolved in 10 ml of DI water and then added to the $Zn(OAc)_2 \cdot 2H_2O$/ $CoCl_2 \cdot 6H_2O$ solution under sonication. The DMC catalyst precipitated out and was isolated via filtering and drying.

EXAMPLE 2

The DMC catalyst synthesized according to Example 1 was used to produce a polyether polyol (Example 2A) and polycarbonate polyols (Examples 2B and 2C). More specifically, this catalyst was used to polymerize propylene oxide and to co-polymerize propylene oxide with $CO_2$ according to Examples 2A to 2C described in the table below.

| Example | Initiator | Amt. (g) | Catalyst | Amt. (mg) | Alkylene Oxide | Amt. (ml) | $CO_2$ | Amt. (psi) |
|---|---|---|---|---|---|---|---|---|
| 2A | A | 0.5 | Example 1 | 20 | Propylene Oxide | 3 | No | 0 |
| 2B | A | 0.5 | Example 1 | 20 | Propylene Oxide | 3 | Yes | 100 |
| 2C | A | 0.5 | Example 1 | 20 | Propylene Oxide | 3 | Yes | 500 |

Examples 2A to 2C were charged, along with other samples, into three wells of a specialized nine well reactor. The specialized nine well reactor is a steel plate that includes nine distinct wells for reaction. Each of the wells is approximately 5 ml in volume. Initiator A and the DMC catalyst were charged into their respective wells and the entire reactor was put into a vacuum oven at 100 1C for 2 hours. Initiator A is a poly-functional alcohol. More specifically, Initiator A is a tri-functional polyol formed by adding propylene oxide to a glycerin nucleus and is commercially available from BASF Corporation, Wyandotte, Mich., as Pluracol® GP730. After 2 hours, the entire reactor was cooled under vacuum. The propylene oxide was then charged and the reactor was then closed and flushed with Argon. The reactor, specifically each of the wells in the reactor, were mechanically agitated, i.e., stirred, with a magnetic stirrer for from 30 to 60 minutes. Next, a temperature of the wells was increased to 99–107° C. and the $CO_2$ was charged (for Examples 2B and 2C only). The increased temperature was maintained overnight, i.e., for approximately 15 hours. The wells were then cooled, vented, and opened to evaluate the yield of the polyether polyol or polycarbonate polyol in each well.

Upon visual evaluation of the polyether polyol of Example 2A and of the polycarbonate polyols of Examples 2B and 2C remaining in the reactor after production according to Examples 2A to 2C, it was concluded that each of Examples 2A to 2C produced an acceptable yield, i.e., there was an increase in the mass of the polyols remaining in each well as compared to the initial 0.5 grams of Initiator A.

The invention has been described in an illustrative manner, and it is to be understood that the terminology which has been used is intended to be in the nature of words of description rather than of limitation. Obviously, many modifications and variations of the present invention are possible in view of the above teachings. It is, therefore, to be understood that within the scope of the claims the invention may be practiced otherwise than as specifically described.

What is claimed is:

1. A method of synthesizing a double metal cyanide (DMC) catalyst, said method comprising:
combining and sonicating a solution of a first metal salt of the general formula $M(X)_m$, a solution of a second metal salt of the general formula $N(Y)_n$, and a solution of an alkali metal cyanide wherein;
M is selected from the group of aluminum, zinc, and the transition metals,
X is an anion selected from the group of halides, hydroxides, sulfates, carbonates, cyanides, oxalates, thiocyanates, isocyanates, isothiocyanates, carboxylates, and nitrates,
m is a value from 1 to 3 satisfying the valency state of M,
N is selected from the group of the transition metals and the lanthanides,
Y is an anion selected from the group of halides, hydroxides, sulfates, carbonates, cyanides, oxalates, thiocyanates, isocyanates, isothiocyanates, carboxylates, and nitrates, and
n is a value from 1 to 3 satisfying the valency state of N.

2. A method as set forth in claim 1 wherein said sonicating is further defined as sonicating at a frequency of at least 15 kHz.

3. A method as set forth in claim 1 wherein said sonicating is further defined as sonicating at a source power of at least 20 eW.

4. A method as set forth in claim 1 wherein said sonicating is further defined as sonicating for a time period of from 1 to 60 minutes.

5. A method as set forth in claim 1 wherein said sonicating is further defined as continuously sonicating.

6. A method as set forth in claim 1 wherein said sonicating is further defined as discontinuously sonicating.

7. A method as set forth in claim 1 wherein the solutions of the first metal salt, the second metal salt, and the alkali metal cyanide each include from 0.1 to 50 parts by weight of the first metal salt, the second metal salt, and the alkali metal cyanide, respectively, based on 100 parts by weight of the solution.

8. A method as set forth in claim 1 wherein the solutions of the first metal salt, the second metal salt, and the alkali metal cyanide comprise the first metal salt, the second metal salt, and the alkali metal cyanide, respectively, dissolved in water, such that the solutions are aqueous solutions.

9. A method as set forth in claim 1 wherein the solutions of the first metal salt, the second metal salt, and the alkali metal cyanide comprise the first metal salt, the second metal salt, and the alkali metal cyanide, respectively, dissolved in methanol, such that the solutions are non-aqueous solutions.

10. A method as set forth in claim 1 wherein the solutions of the first metal salt, the second metal salt, and the alkali metal cyanide comprise the first metal salt, the second metal salt, and the alkali metal cyanide, respectively, dissolved in a non-aqueous solvent selected from the group of polar protic solvents, dipolar aprotic solvents, and combinations thereof, such that the solutions are non-aqueous solutions.

11. A method as set forth in claim 10 wherein the polar protic solvents are selected from the group of alkanols, carboxylic acids, and combinations thereof.

12. A method as set forth in claim 10 wherein the dipolar aprotic solvents are selected from the group of ketones, alkyl acetates, nitrites, formamides, sulfoxides, N-alkylpyrrolidinones, and combinations thereof.

13. A method as set forth in claim 1 wherein the alkali metal cyanide is selected from the group of KCN, LiCN, and NaCN.

14. A method as set forth in claim 1 wherein said combining is further defined by first combining the solution of $M(X)_m$ with the solution of $N(Y)_n$ to establish a first solution.

15. A method as set forth in claim 14 wherein said combining is further defined by combining the first solution with the solution of the alkali metal cyanide.

16. A method as set forth in claim 1 wherein said combining forms a suspension having a continuous phase and a particle phase dispersed throughout the continuous phase wherein the particle phase comprises the DMC catalyst synthesized from the combination of the solutions of the first metal salt, the second metal salt, and the alkali metal cyanide, and the continuous phase comprises a secondary product.

17. A method as set forth in claim 16 further comprising the step of separating the particle phase from the continuous phase.

18. A method as set forth in claim 17 wherein said separating the particle phase from the continuous phase comprises the step of filtering the suspension to collect the particle phase comprising the DMC catalyst as a retentate.

19. A method of synthesizing a double metal cyanide (DMC) catalyst, said method comprising:
combining and sonicating a solution of a first metal salt of the general formula $M(X)_m$, a solution of a second metal salt of the general formula $N(Y)_n$, and a solution of an alkali metal cyanide wherein;
M is selected from the group of Al(III) and Zn(II),
X is an anion selected from the group of halides and acetate,
m is a value from 1 to 3 satisfying the valency state of M;
N is selected from the group of the Fe(II), Fe(III), Co(II), Co(III), and Nd(III),
Y is an anion selected from the group of halides, and
n is a value from 1 to 3 satisfying the valency state of N.

20. A method as set forth in claim 19 wherein said sonicating is further defined as sonicating at a frequency of at least 15 kHz.

21. A method as set forth in claim 19 wherein the solutions of the first metal salt, the second metal salt, and the alkali metal cyanide comprise the first metal salt, the second metal salt, and the alkali metal cyanide, respectively, dissolved in water, such that the solutions are aqueous solutions.

22. A method as set forth in claim 19 wherein the solutions of the first metal salt, the second metal salt, and the alkali metal cyanide comprise the first metal salt, the second metal salt, and the alkali metal cyanide, respectively, dissolved in methanol, such that the solutions are non-aqueous solutions.

23. A method as set forth in claim 19 wherein the solutions of the first metal salt, the second metal salt, and the alkali metal cyanide comprise the first metal salt, the second metal salt, and the alkali metal cyanide, respectively, dissolved in a non-aqueous solvent selected from the group of polar protic solvents, dipolar aprotic solvents, and combinations thereof, such that the solutions are non-aqueous solutions.

24. A method as set forth in claim 19 wherein the alkali metal cyanide is selected from the group of KCN, LiCN, and NaCN.

25. A method as set forth in claim 19 wherein said combining forms a suspension having a continuous phase and a particle phase dispersed throughout the continuous phase wherein the particle phase comprises the DMC catalyst synthesized from the combination of the solutions of the first metal salt, the second metal salt, and the alkali metal cyanide, and the continuous phase comprises a secondary product.

26. A method as set forth in claim 25 further comprising the step of separating the particle phase from the continuous phase.

27. A method of synthesizing a double metal cyanide (DMC) catalyst, said method comprising:
 combining and sonicating a solution of $Zn(OAc)_2$, a solution of $CoCl_2$, and a solution of NaCN.

28. A method as set forth in claim 27 wherein said sonicating is further defined as sonicating at a frequency of at least 15 kHz.

29. A method as set forth in claim 27 wherein the solutions of $Zn(OAc)_2$, $CoCl_2$, and NaCN comprise $Zn(OAc)_2$, $CoCl_2$, and NaCN, respectively, dissolved in water, such that the solutions are aqueous solutions.

30. A method as set forth in claim 27 wherein the solutions of $Zn(OAc)_2$, $CoCl_2$, and NaCN comprise $Zn(OAc)_2$, $CoCl_2$, and NaCN, respectively, dissolved in methanol, such that the solutions are non-aqueous solutions.

31. A method as set forth in claim 27 wherein the solutions of $Zn(OAc)_2$, $CoCl_2$, and NaCN comprise $Zn(OAc)_2$, $CoCl_2$, and NaCN, respectively, dissolved in a non-aqueous solvent selected from the group of polar protic solvents, dipolar aprotic solvents, and combinations thereof, such that the solutions are non-aqueous solutions.

* * * * *